United States Patent [19]
Self

[11] 3,978,018
[45] Aug. 31, 1976

[54] POLYMERIZABLE COMPOSITIONS CONTAINING UNSATURATED POLYESTER RESINS AND AQUEOUS ALKALI STABILIZED COLLOIDAL SILICA, METHOD OF PREPARING SHAPED ARTICLES FROM SUCH COMPOSITIONS AND THERMOSET PRODUCTS THEREOF

[75] Inventor: James M. Self, Pittsburgh, Pa.
[73] Assignee: H. H. Robertson Company, Pittsburgh, Pa.
[22] Filed: June 17, 1974
[21] Appl. No.: 480,169

[52] U.S. Cl. .............................. 260/40 R; 106/306; 106/DIG. 2; 260/29.2 UA
[51] Int. Cl.² ............................................ C08K 3/36
[58] Field of Search ................. 260/29.2 UA, 40 R; 106/306, DIG. 2

[56] References Cited
UNITED STATES PATENTS

| | | | |
|---|---|---|---|
| 2,634,208 | 4/1953 | Miscall et al. | 106/DIG. 2 |
| 3,131,072 | 4/1964 | Taulli | 260/40 R X |
| 3,256,219 | 6/1966 | Will | 260/29.2 UA |
| 3,311,585 | 3/1967 | Edlin | 260/29.2 UA |
| 3,810,773 | 5/1974 | Shannon | 106/DIG. 2 |

Primary Examiner—Lewis T. Jacobs
Assistant Examiner—S. M. Person
Attorney, Agent, or Firm—Harry B. Keck; George E. Manias

[57] ABSTRACT

Polymerizable unsaturated polyester resin syrups can be extended with aqueous alkali stabilized colloidal silica in compositions containing from 0.1 to 10.0 parts by weight of aqueous alkali stabilized colloidal silica for each part by weight of the unsaturated polyester resin syrup. The unsaturated polyester resin syrups can be extended further (a) by the addition of reactive fillers such as metal oxides or hydrated metallic salts; (b) by the addition of inert fillers such as clay, silica, glass fibers, perlite; or (c) by the addition of both (a) and (b). The fillers also may include fibrous reinforcing materials such as dispersed glass fibers, randomly oriented fiber mats, wound filaments and woven fabrics. The fillers may be present in amounts from about 0.1 to about 5 times the combined weight of aqueous alkali stabilized colloidal silica and unsaturated polyester resin syrup.

The compositions can be employed in coatings, laminates, cast articles, molded articles, or other shaped articles. The polymerized products are resistant to combustion, have a low fuel content, a low flame spread and are useful thermal insulating materials. The products furthermore have a low smoke content. When exposed to fire, the organic content of these materials is burned and the residual inorganic content is converted to a refractory ceramic material which resists further thermal deterioration and functions as a thermal insulator to resist thermal transfer.

26 Claims, No Drawings

POLYMERIZABLE COMPOSITIONS CONTAINING UNSATURATED POLYESTER RESINS AND AQUEOUS ALKALI STABILIZED COLLOIDAL SILICA, METHOD OF PREPARING SHAPED ARTICLES FROM SUCH COMPOSITIONS AND THERMOSET PRODUCTS THEREOF

CROSS-REFERENCES TO RELATED APPLICATIONS — None.

BACKGROUND OF THE INVENTION

1. Field of the Invention

This invention relates to polymerizable unsaturated polyester resin syrup compositions, to methods of curing such polymerizable unsaturated polyester resin syrup compositions in the presence of significant quantities of aqueous alkali stabilized colloidal silica, and to the thermoset products obtained thereby.

2. Description of the Prior Art

Unsaturated polyester resin syrups are employed in the production of coatings, molded, cast and hand-lay-up products such as flat and profiled building sheets, automobile fenders and other shaped components, furniture, plumbing fixtures, duct work, boats, electrical component housings, electrical circuit boards, and the like. The unsaturated polyester resin syrups are frequently reinforced with fibrous fillers, customarily glass fibers and may be extended with inert particulate fillers such as wood flour, silica, glass beads, clay calcium carbonate and the like. See "Polyesters and Their Applications", Bjorksten et al., Reinhold Publishing Corporation, New York 1960 (4th printing).

Unsaturated polyester resin syrups also have been extended by dispersing water in the resin in the form of small droplets. Such emulsions have been described as containing 40 to 85 per cent by weight water in combination with 15 to 60 per cent by weight of unsaturated polyester syrups. See U.S. Pat. No. 3,591,191. Compositions containing 50 to 80 per cent by weight of water in a mixture of water and unsaturated polyester resin syrup are described in U.S. Pat. No. 3,687,883.

Small quantities of silica aerogel have been employed as thickeners for unsaturated polyester resins, U.S. Pat. No. 2,610,959.

SUMMARY OF THE INVENTION

The present compositions combine an unsaturated polyester resin syrup and aqueous alkali stabilized colloidal silica. The present compositions do not appear to be true emulsions, but instead, appear to blend into useful mixtures wherein the aqueous alkali stabilized colloidal silica is altered. The identity of the unsaturated polyester resin ingredient of the unsaturated polyester resin syrup also is altered. In this sense the present compositions and products are unlike the water extended polyester resins of the prior art.

In the absence of a catalyst, the unsaturated polyester resin is a water white to amber clear liquid. The aqueous alkali stabilized colloidal silica is a clear to opalescent liquid. On mixing, the mixture develops a cloudy white appearance and resembles immediately a partially gelled colloidal silica. The viscosity of the mixture increases until the mixture resembles a doughy paste having the consistency of potter's clay.

Some mixtures gel very rapidly to yield a hard gel within minutes. Other mixtures thicken more slowly and remain liquid for appreciable periods of time provided that the liquid water content is retained, that is, neither vaporized nor frozen; within about 24 hours, all of the mixtures thicken to the same hard gel.

The aqueous alkali stabilized colloidal silica is provided in quantities ranging from 0.1 to 10 parts by weight for each part by weight of unsaturated polyester resin syrup. In the present specification, the expression unsaturated polyester resin syrup is employed to identify what is well known in the art as the combination of an unsaturated polyester resin and a copolymerizable monomer. The preferred aqueous alkali stabilized colloidal silica contains from about 50 to about 90 parts by weight of water and about 50 to 10 parts by weight of alkali stabilized colloidal silica solids containing 0.05 to 0.8 parts by weight $Na_2O$. Suitable initiating catalysts for the polymerization of unsaturated polyester resin syrups are included in the composition. These are normally peroxy compounds. Suitable accelerators for the initiators may be included. The initiator may be added to the unsaturated polyester resin syrup or to the aqueous alkali stabilized colloidal silica. The accelerator, if employed, preferably is added to that liquid component which does not contain the initiator.

Where fillers are employed they may be added to either of the liquid components or to both of the liquid components. Preferably where the fillers are inert bulking agents such as finely divided perlite or expanded vermiculite, they are not employed until after the two liquids have been mixed. In general the amount of filler may be from 0.1 to 5.0 parts by weight for each part by weight of the mixture of resin syrup and aqueous alkali stabilized colloidal silica.

A preferred active filler is aluminum oxide trihydrate $Al_2O_3.3H_2O$, also known as hydrated alumina. This material may be incorporated into either or both of the liquid components in quantities up to about 1.5 times the weight of the unsaturated polyester resin syrup and up to about 3 times the weight of the aqueous alkali stabilized colloidal silica. Thus the amount of aluminum oxide trihydrate should be less than the sum of (a) 1.5 times the weight of resin syrup plus (b) 3.0 times the weight of aqueous alkali stabilized colloidal silica. Preferably the aluminum oxide trihydrate is pulverized to a fineness approximating minus-325 mesh U.S. standard screen.

The inclusion of aluminum oxide trihydrate in the present compositions increases the physical strength of the compositions, e.g. hardness and abrasion resistance.

Where reinforcing fibrous fillers are employed, glass fibers are preferred, specifically the glass fibers which are useful in reinforcing plastic sheets, i.e., randomly oriented fibers of the type employed in glass fiber reinforced plastic laminates. The glass fibers may be employed as a deposited mat of fibers, as a preformed glass fiber mat or may be in the form of continuous filaments or woven fabrics. In general the weight of glass fibers is from about 10 to 200 per cent of the weight of unsaturated polyester resin syrup in the final polymerizable composition.

The present materials have excellent processing characteristics. Within minutes after forming, the resulting shapes have sufficient strength to be handled and put to use. The materials more importantly have a low smoke generating potential when burned.

Unsaturated polyester resins are customarily fabricated from polyesterification of polycarboxylic acids or polycarboxylic acid anhydrides and polyols, customarily glycols. One of the ingredients in the polyester contains ethylenic unsaturation, customarily the polycarboxylic acid. Typically unsaturated polyester resins are fabricated from dicarboxylic acids such as phthalic acid, phthalic anhydride, adipic acid, succinic acid, tetrahydrophthalic acid or anhydride, tetrabromo phthalic acid or anhydride, maleic acid or anhydride, fumaric acid. Typical glycols include ethylene glycol, propylene glycol, butylene glycol, neopentyl glycol, diethylene glycol, dipropylene glycol, polyethylene glycol, polypropylene glycol. Occasionally trihydric and higher polyols are included in the polyester such as trimethylol ethane, trimethylol propane, pentaerythritol. Customarily a slight stoichiometric excess of glycol is employed in preparing the unsaturated polyester.

Unsaturated polyester resin syrups are prepared when the unsaturated polyester resin is combined with copolymerizable monomers which contain terminal vinyl groups. Such monomers include styrene, alphamethyl styrene, o-chloro-styrene, vinyl toluene, acrylic acid, methacrylic acid, alkyl acrylates, alkyl methacrylates, divinyl benzene, diacrylates, dimethacrylates, triacrylates, trimethacrylates and the like. Customarily the copolymerizable monomer is provided in an amount to constitute from about 10 to 40 weight per cent of the unsaturated polyester resin syrup, i.e., the unsaturated polyester resin comprises about 90 to 60 weight per cent of the resin syrup.

A desirable modifying copolymerizable monomer is a reaction product of polyepoxide with acrylic or methacrylic acid. Such products are described in U.S. Pat. Nos. 3,373,075, 3,301,743. Similar products can be prepared by combining a polyol such as bisphenol-A with glycidyl acrylate or glycidyl methacrylate. Such modifying copolymerizable monomers can be employed as a partial replacement for other copolymerizable monomers or as a partial replacement for a portion of the unsaturated polyester resin of the resin syrup.

The aqueous alkali stabilized colloidal silica will have the properties shown in Table I.

TABLE I

Mean particle size of colloidal silica particles, 4 to 60 millimicrons
pH, 8.5 to 10.5
Viscosity, cp., from 4 to 100
$Na_2O$ content, weight per cent, 0.05 to 0.8
Total concentration $(SiO_2)_x$ weight per cent, 10 to 50

A preferred material has a mean particle size approximately 15 millimicrons; pH about 9.7; viscosity about 12 cp.; $Na_2O$ content about 0.4 weight per cent; and $(SiO_2)_x$ concentration about 40 weight per cent. Aqueous alkali stabilized colloidal silica is available commercially from Nalco Chemical Company and E. I. du Pont de Nemours Company.

Aqueous alkali stabilized colloidal silica dispersions can be produced by converting aqueous sodium silicate into aqueous silicic acid by removing sodium ions. One manner of accomplishing the sodium ion removal is to pass a dilute aqueous solution of sodium silicate through a cation exchange resin in hydrogen form. The effluent aqueous solution of silicic acid is generally unstable but can be stabilized by the addition of sufficient alkali in the form of sodium ions, potassium ions, lithium ions or ammonium ions. The aqueous solutions, thus alkali stabilized, can be dehydrated to approach a minimum water content which varies somewhat for each individual composition. The aqueous content cannot be reduced below a critical minimum water level without introducing irreversible conversion of the colloidal silica to a silica glass. The water content can be lost by evaporation or by unintended freezing of the aqueous dispersion. Both freezing and evaporation should be avoided in order to prevent the irreversible glass formation. The aqueous alkali stabilized colloidal silica is a faintly opalescent liquid having a density of about 10.0 to 11.5 pounds per gallon at 15.6°C and a viscosity of about 4 to 100 centipoises at 25°C. The silica content, expressed as $(SiO_2)_x$ is 10 to 50 weight per cent when the material is commercially distributed with slightly more than the minimum critical water content. The alkali content where sodium hydroxide is employed ranges from about 0.05 to 0.8 weight per cent in $Na_2O$, or about 0.25 weight per cent $NH_3$ where ammonia is employed as the stabilizing alkali. Mean particle size of the colloidal silica particles ranges from 4 to 60 millimicrons.

Two typical commercially available materials are sold by E. I. du Pont de Nemours and Company under the trade name LUDOX as shown in Table II.

TABLE II

| | LUDOX HS 40* | LUDOX TM** |
|---|---|---|
| Silica content, weight per cent $SiO_2$ | 40 | 49 |
| Weight per cent alkali as $Na_2O$ | 0.43 | 0.21 |
| Viscosity, centipoises | 17.5 | 50 |
| pH | 9.7 | 8.9 |
| Approximate particle diameter, millimicrons | 13–14 | 22–25 |
| Weight, pounds per gallon | 10.8 | 11.5 |

*HS 40 is an abbreviation for high sodium stabilization, 40 weight per cent silica;
**TM is presumed to be an acronym for twenty millimicrons, particle size.

Typical initiators for unsaturated polyester resin syrups include peroxy materials such as benzoyl peroxide, cumene hydroperoxide, tertiary butyl peroxide and the like. A particularly useful peroxy initiator for room temperature curing is 3,5-dimethyl hexane-2,5-dimethyl-diper-2-ethyl hexoate. The peroxy initiators customarily are provided in the form of pastes in which the peroxy material is dispersed in a glycol. Accelerators for the peroxy initiators include cobalt naphthenate and cobalt octoate, for example.

The mixing of the liquid unsaturated polyester resin syrup and the aqueous alkali stabilized colloidal silica may occur in several ways. The materials may be dumped into a common container and stirred. The two liquid materials may be sprayed separately with the sprays of the two materials impinging upon one another to provide a combined spray in which the spray particles are homogeneously admixed. The two liquids may be introduced into spraying equipment which has a common mixing chamber preceding the spray nozzle.

The peroxy initiator is selected so that the initiation of polymerization of the unsaturated polyester resin syrup can be controlled by the operator. Customarily a peroxy initiator is selected which will require heating of the composition to initiate polymerization, i.e., a so-called high temperature initiator.

In a preferred embodiment of the invention, the unsaturated polyester resin syrup contains powdered hydrated alumina and the aqueous alkali stabilized colloidal silica also contains hydrated alumina. The amount of unsaturated polyester resin syrup is minimized so that the final product possesses a low fuel content. When exposed to fire, the cured products resist temperature increases initially because of the thermal dehydration of the hydrated alumina and thereafter by vitrification of the colloidal silica.

According to the methods of this invention, cured thermoset articles can be prepared from a mixture of unsaturated polyester resin syrup and aqueous alkali stabilized colloidal silica by combining the two ingredients along with a polymerization initiator for the unsaturated polyester resin syrup. The composition is shaped into the shape of the desired article and retained in that shape until the composition is cured. The shaping may occur by molding, pressing, casting, hand-lay-up, spraying onto a substrate, trowelling, extrusion, rolling and the like. The polymerization initiator can be included in either of the two components. Where a high temperature initiator is employed, it is preferred that the initiator be included in the unsaturated polyester resin. Where a room temperature initiator is employed, it is preferably included in the aqueous alkali stabilized colloidal silica solution. In that circumstance, a polymerization accelerator will be included in the unsaturated polyester resin syrup. The two components can be mixed in a mixing tank or pipe. The two components can be separately formed into airborne sprays which are caused to impinge upon one another and thereby accomplish the desired mixing. The two components can be combined in a mixing chamber and sprayed as a mixture onto a substrate. Either or both of the two components can include inert fillers. Preferably with bulking agents such as finely divided perlite or expanded vermiculite, the inert fillers are added to the components after they have been mixed.

A particularly preferred product resulting from the practice of the present invention is a fiber reinforced laminate article which includes randomly oriented reinforcing fibers, e.g., glass fibers, which are dispersed in a continuous phase of the thermoset resinous composition.

The resinous composition in its cured form includes unsaturated polyester resin cross-linked with the copolymerizable monomer of the polyester resin syrup. However the unsaturated polyester is slightly modified in that a portion of its initially unreacted carboxylic acid groups are converted to carboxylate salt groups by the presence of the alkali stabilizing agent of the colloidal silica dispersion. The unsaturated polyester resin also retains some of its unreacted carboxylic acid groups. Evidence of both carboxylic acid groups and carboxylate salt groups are found in infra-red spectrum analyses of the cured product. The elimination of the alkali stabilizing agent from an effective role in the mixture renders the colloidal silica unstable so that it gels rapidly and irreversibly to a flocculated gel, uniformly dispersed throughout the cured unsaturated polyester resin syrup.

The laminates preferably include glass fibers as the reinforcing fibers in amounts from about 6 to 30 per cent of the weight of the laminate. The polymerizable composition for forming such useful laminates contains about 0.1 to 5.0 parts by weight of the reinforcing fibers for each part by weight of the mixture of unsaturated polyester resin syrup and aqueous alkali stabilized colloidal silica. The laminates may be further reinforced by including as a core a sheet of expanded metal lath.

Typical products of the present compositions are cast articles such as furniture, frame moldings, lamp bases, statuary, skeet targets, toys; molded articles such as automobile surface elements, electrical housings; hand-lay-up or spray-up articles such as boat hulls, bathroom sinks, tubs and shower stalls, cargo containers; reinforced laminates such as building construction panels, ventilator components, hoods, ducting, ceiling tiles, window frames, doors; cast-in-place or spray-in-place articles such as fire resistant coatings.

BRIEF DESCRIPTION OF THE DRAWINGS —None.

DESCRIPTION OF THE PREFERRED EMBODIMENT(S)

According to this invention useful products are prepared by mixing
1. a pourable and/or sprayable polymerizable unsaturated polyester resin syrup which may be a liquid or a paste in which the syrup is unfilled or is filled with active fillers such as hydrated alumina or other hydrated metallic salts or oxides and/or is filled with inert fillers such as silica, calcium carbonate; and
2. a pourable and/or sprayable liquid consisting of aqueous alkali stabilized colloidal silica solution which may be unfilled or may be filled with active fillers such as hydrated alumina or other hydrated metallic salts or oxides and/or may be filled with inert fillers such as silica, calcium carbonate.

A polymerization initiator for the unsaturated polyester resin syrup is included in the mix.

The mix may be further extended, after mixing, by combining into the mixture inert fillers such as refractory aggregates, ground glass, glass microspheres, silica, magnesium oxide, mullite, flyash, zirconia, clays, bentonite, kaolin, attipulgite, titanium dioxide, antimony oxide, pigments, low density insulating materials, such as perlite or expanded vermiculite, fibrous reinforcing material such as glass fibers, asbestos fibers, mineral wool. Inert fillers tend to increase the density or to decrease the density of the final product according to the selected filler, and may tend to reinforce the resulting product, particularly where fibrous fillers are selected. Incombustible fillers also disperse the combustible components and consequently lower the fuel content of the final product. Fillers can comprise from 0.1 to 5.0 parts by weight for each part by weight of the mix.

The materials of this invention are preferably cured at temperatures below about 100°C to minimize the vaporizing tendency of the water content of the aqueous alkali stabilized colloidal silica. Excessive curing temperatures may cause rupturing or spalling of the resulting shaped article. When the two liquids are mixed, along with suitable fillers, the consistency of the product is similar to potter's clay in a preferred embodiment. In this consistency the mixture can be troweled and can be applied to horizontal, vertical and overhead surfaces by troweling, rolling, pressing or extrusion as desired to produce coatings. The mixture also can be injection molded, press molded or employed in hand-lay-up operations or in casting operations.

Preferably the viscosity of the unsaturated polyester resin syrup ranges from about 50 to 5,000 centipoises.

The increasing viscosity which occurs upon mixing aqueous alkali stabilized colloidal silica with unsaturated polyester resin syrup appears to be the result of several competing phenomena which are principally:

A. The formation of a small amount of carboxylate salts by reaction of the unreacted carboxylic acid groups of the unsaturated polyester resin with the alkali metal ions of the aqueous alkali stabilized colloidal silica;

B. The conversion of the aqueous alkali stabilized colloidal silica to a silica gel.

A number of factors influence the rate of viscosity increase including:

the content of $Na_2O$ and $SiO_2$;

the acid value of the unsaturated polyester resin;

the initial viscosity of the unsaturated polyester resin syrup and of the aqueous alkali stabilized colloidal silica.

To some extent the viscosity increase depends upon the amount and identity of polymerizable monomer included in the unsaturated polyester resin syrup; also the identity and concentration of the particulate fillers, if any, in the mixture may affect the viscosity increase.

Silica gels are known to exist in at least three different types including a polymerization gel, a flocculation gel, and a mixed or hybrid gel.

The polymerization gel results from the conversion of aqueous sodium silicate to silicic acid by neutralization. The polymerization gel consists of polysilicate ions extended as a three-dimensional, cross-linked network throughout the solution. The flocculation gel occurs when preformed colloidal silica particles combine through junction points with siloxane bonds. The hybrid gel appears to be a combination of the first two forms of gel and includes preformed colloidal silica particles joined by polysilicic acid chains.

In general, the cured products obtained by polymerizing the mixtures of unsaturated polyester resin syrup and aqueous alkali stabilized colloidal silica will contain at least 5 per cent by weight of colloidal silica gel which is generated in situ and which is homogeneously dispersed with the cross-linked unsaturated polyester resin syrup wherein at least a portion of the cross-linked polyester contains both carboxylate salt groups and unreacted carboxylic acid groups in its polymerized state. The silica gel of the present compositions appears to be the flocculation gel as described above.

EXAMPLE 1

An unsaturated polyester resin syrup (hereinafter identified as resin syrup I) contains 25 parts by weight styrene and 75 parts by weight of the unsaturated polyester resin which is obtained as follows:

60 mols phthalic anhydride
40 mols maleic anhydride
106 mols propylene glycol are combined and esterified to an acid number of about 20 to produce a general purpose unsaturated polyester resin. One gram of benzoyl peroxide powder is added to 100 grams of the unsaturated polyester resin syrup I as a catalyst. This unsaturated polyester resin syrup is combined with 100 grams of aqueous alkali stabilized colloidal silica LUDOX HS 40 (see Table II) containing 60 per cent by weight water and 40 per cent by weight silica solids.

Following mixing of the two liquids, the viscosity of the mixture begins to increase. The mixture was applied to a sheet of cellophane within a ½ inch diameter tubing O-ring having a 6 inch ring diameter. A second sheet of cellophane was applied on top of the O-ring and the resulting cellophane sandwich was pressed to produce a disk ½ inch thick and 6 inches in diameter. That disk was placed in an oven at 90°C for about 15 minutes. The disk was allowed to set overnight and lost some water content through evaporation. The disk had a chalky-white appearance and a specific gravity of 0.82. Thereupon the disk was placed on a ring stand approximately 2 inches above a Bunsen burner. The Bunsen burner flame impinged upon the disk. Within the first 5 minutes of impingement some small amount of smoke was detected. Thereafter no smoke was observed. The disk remained over the Bunsen burner for 6 hours. Throughout the flame exposure, the disk retained its shape and integrity.

EXAMPLE 2

Example 1 was duplicated except that the unsaturated polyester resin syrup I was modified by including two drops of Triton X-100, a non-ionic surfactant available from Rohm & Haas Company. The resin syrup I and the aqueous alkali stabilized colloidal silica (Ludox HS 40, see Table II) were mixed and formed into a disk ½ inch thick and 6 inches in diameter. This disk was tested in the manner described in Example 1 with the same results. A conclusion from Example 2 is that the absence of a surfactant (Example 1) is indistinguishable from the presence of a surfactant (Example 2).

EXAMPLE 3

50 grams of the unsaturated polyester resin syrup I is combined with 50 grams of alumina trihydrate, minus-325 mesh U.S. standard screen, and 0.5 gram benzoyl peroxide powder to form component 1. 50 grams of aqueous alkali stabilized colloidal silica (Ludox TM, see Table II) is combined with 50 grams of alumina trihydrate, minus-325 mesh U.S. standard screen, to form component 2. When the alumina trihydrate is mixed with the aqueous alkali stabilized colloidal silica, a thixotropic slip is formed having a viscosity of 70 to 6000 cps (Brookfield). Component 1 and component 2 are stirred together in a beaker and formed into a disk ¼ inch thick and 4 inches in diameter. The disk is cured in an oven at 90°C for 15 minutes. The disk has a chalky-white appearance, specific gravity 1.3 and is tested as described in Example 1. Essentially no smoke or flame is detected throughout the 6 hour test. The burnt-out disk appears to be a continuous, lightweight composition.

Example 3 illustrates a composition extended with an equal weight of alumina trihydrate based on the combined weight of unsaturated polyester resin syrup and alkali stabilized colloidal silica.

EXAMPLE 4

Example 3 is repeated except that 10 grams of perlite (minus-40 mesh U.S. standard screen) is thoroughly mixed into the mixture of component 1 and component 2. The composition is shaped into a disk ⅜ inch thick and 3 inches in diameter. The disk is cured and tested in the manner described in Example 1. No smoke or flame is detected during the test. After the sample has been over the Bunsen burner flame for one hour, the topside can be touched by hand without discomfort indicating that the material possesses outstanding thermal insulation characteristics.

EXAMPLE 5

Example 3 is repeated with two variations. The first variation is that the alumina trihydrate is minus-100 mesh U.S. standard screen. The second variation is that the aqueous alkali stabilized colloidal silica component contains 0.1 grams N,N'-dimethyl aniline as a polymerization accelerator. Components 1 and 2 are mixed and formed into a disk ¼ inch thick and 4 inches in diameter. The disk cures at room temperature in about 1 hour. This example indicates the feasibility of providing a polymerization catalyst in the unsaturated polyester resin syrup and providing a polymerization accelerator in the aqueous alkali stabilized colloidal silica.

EXAMPLE 6

Example 3 is repeated with one variation. Component 1 consists of 50 grams of polymerizable unsaturated polyester resin 1 and 50 grams of alumina trihydrate (minus-325 mesh U.S. standard screen) and 0.1 gram methyl ethyl ketone peroxide (60% solution in dimethyl phthalate) and 20 drops cobalt naphthenate (6% solution in glycol). The viscosity of component 1 is about 4000 to 5000 cps (Brookfield). Component 2 is the same as in Example 3. Components 1 and 2 are thoroughly mixed by stirring in a beaker with a spatula and shaped into a disk ¼ inch thick and 4 inches in diameter. The disk cures in approximately 45 minutes at room temperature.

This example indicates the feasibility of providing a catalyst and an accelerator in the unsaturated polyester resin syrup.

EXAMPLE 7

A number of disks were prepared employing component 1 and component 2 as described in Example 5. The ratio of component 1/component 2 was 80/20, 60/40, 50/50, 40/60, 20/80, and 10/90. Each of the formulations was formed into a disk ¼ inch thick and 4 inches in diameter. Each disk was tested as described in Example 1. The results of the tests are set forth in the following table.

TABLE I

| Specimen | Component 1 Component 2 By Weight | Smoke | Flame | Appearance After 6 Hrs. Burning |
|---|---|---|---|---|
| A | 80/20 | Heavy | | Fell Apart |
| B | 60/40 | Light | | Fell Apart |
| C | 50/50 | Light | Very Light | Fair |
| D | 40/60 | Very Light | | Good |
| E | 20/80 | Hard to Detect | | Very Good |
| F | 10/90 | Hard to Detect | | Excellent |

It will be observed from Table I that the specimens (A, B) with a high content of unsaturated polyester resin syrup tend to produce smoke, flame and to deteriorate when exposed to burning. As the amount of unsaturated polyester resin syrup is decreased, the amount of smoke and flame decreases and the resistance to burning increases. The materials become increasingly difficult to mix as the amount of unsaturated polyester resin syrup is diminished. Specimens A, B, C and D mix readily. Specimen E is a little difficult to mix. Specimen F was quite difficult to mix.

I claim:

1. A polymerizable composition comprising one part by weight of unsaturated polyester resin syrup; 0.1 to 10 parts by weight of aqueous alkali stabilized colloidal silica; and a polymerization initiator for the said unsaturated polyester resin syrup.

2. The composition of claim 1 wherein the said aqueous alkali stabilized colloidal silica contains 10 to 50 parts by weight colloidal silica having a mean particle size of 4 to 60 millimicrons.

3. A polymerizable composition having one part by weight of the composition of claim 1 uniformly dispersed with 0.1 to 5.0 parts by weight of finely divided perlite.

4. The composition of claim 3 wherein the finely divided fillers are aluminum oxide trihydrate in an amount which is less than the sum of 1.5 times the weight of unsaturated polyester resin syrup plus 3.0 times the weight of aqueous alkali stabilized colloidal silica.

5. The composition of claim 3 wherein the finely divided fillers are inert materials.

6. The composition of claim 5 wherein the finely divided filler is perlite.

7. The composition of claim 5 wherein the finely divided filler is expanded vermiculite.

8. The composition of claim 3 wherein the finely divided fillers are glass fibers comprising from 10 to 200 per cent by weight of the said unsaturated polyester resin syrup.

9. The composition of claim 1 including an accelerator for said polymerization initiator.

10. The polymerizable composition of claim 1 wherein the said unsaturated polyester resin syrup is a combination of
   A. unsaturated polyester resin comprising the reaction products of polyhydric alcohol and polycarboxylic acid or anhydride, at least a portion of which are ethylenically unsaturated polycarboxylic acids or anhydrides; and
   B. at least one copolymerizable monomer having ethylenic unsaturation.

11. The method of preparing a cured thermoset article which comprises
   A. mixing together as a mixture
      1. component 1 comprising one part by weight of an unsaturated polyester resin syrup; and
      2. component 2 comprising 0.1 to 10 parts by weight of aqueous alkali stabilized colloidal silica;
      the said mixture including a polymerization initiator for the said unsaturated polyester resin syrup;
   B. shaping the said mixture to the shape of the desired article; and
   C. curing the shaped mixture.

12. The method of claim 11 wherein the said aqueous alkali stabilized colloidal silica contains 10 to 50 parts by weight colloidal silica having a mean particle size of 4 to 60 millimicrons.

13. The method of claim 12 wherein the said polymerization initiator is an ingredient of component 1.

14. The method of claim 12 wherein the said polymerization initiator is an ingredient of component 2.

15. The method of claim 14 wherein an accelerator for the said polymerization initiator is an ingredient of component 1.

16. The method of claim 12 wherein component 1 is provided as an airborne spray and component 2 is provided as an airborne spray and the two said sprays are impinged to produce the said mixture.

17. The method of claim 12 wherein the said article is shaped by spraying the said mixture onto a substrate.

18. The method of claim 12 wherein the component 1 includes up to 1.5 parts by weight of finely divided aluminum oxide trihydrate.

19. The method of claim 12 wherein the component 2 includes finely divided aluminum oxide trihydrate in an amount up to three times the weight of aqueous sodium silicate.

20. The method of claim 13 wherein the said mixture includes finely divided fillers.

21. The method of claim 20 wherein the said finely divided inert filler is perlite.

22. The method of claim 20 wherein the said finely divided inert filler is expanded vermiculite.

23. A water insoluble polymerized article consisting essentially of a thermoset resin composition containing at least 5 per cent by weight of a colloidal silica gel homogeneously dispersed with cross-linked unsaturated polyester resin syrup wherein the said cross-linked polyester contains both carboxylate salt end groups and unreacted carboxylic acid end groups in its polymerized state.

24. The article of claim 23 including 0.1 to 5.0 parts by weight of inert fillers dispersed throughout one part by weight of the said resin composition.

25. The article of claim 24 wherein at least a portion of the inert fillers are glass fibers.

26. The article of claim 25 wherein at least one part by weight of the said resin composition is combined with 0.06 to 0.30 parts by weight of the said glass fibers.

* * * * *